UNITED STATES PATENT OFFICE.

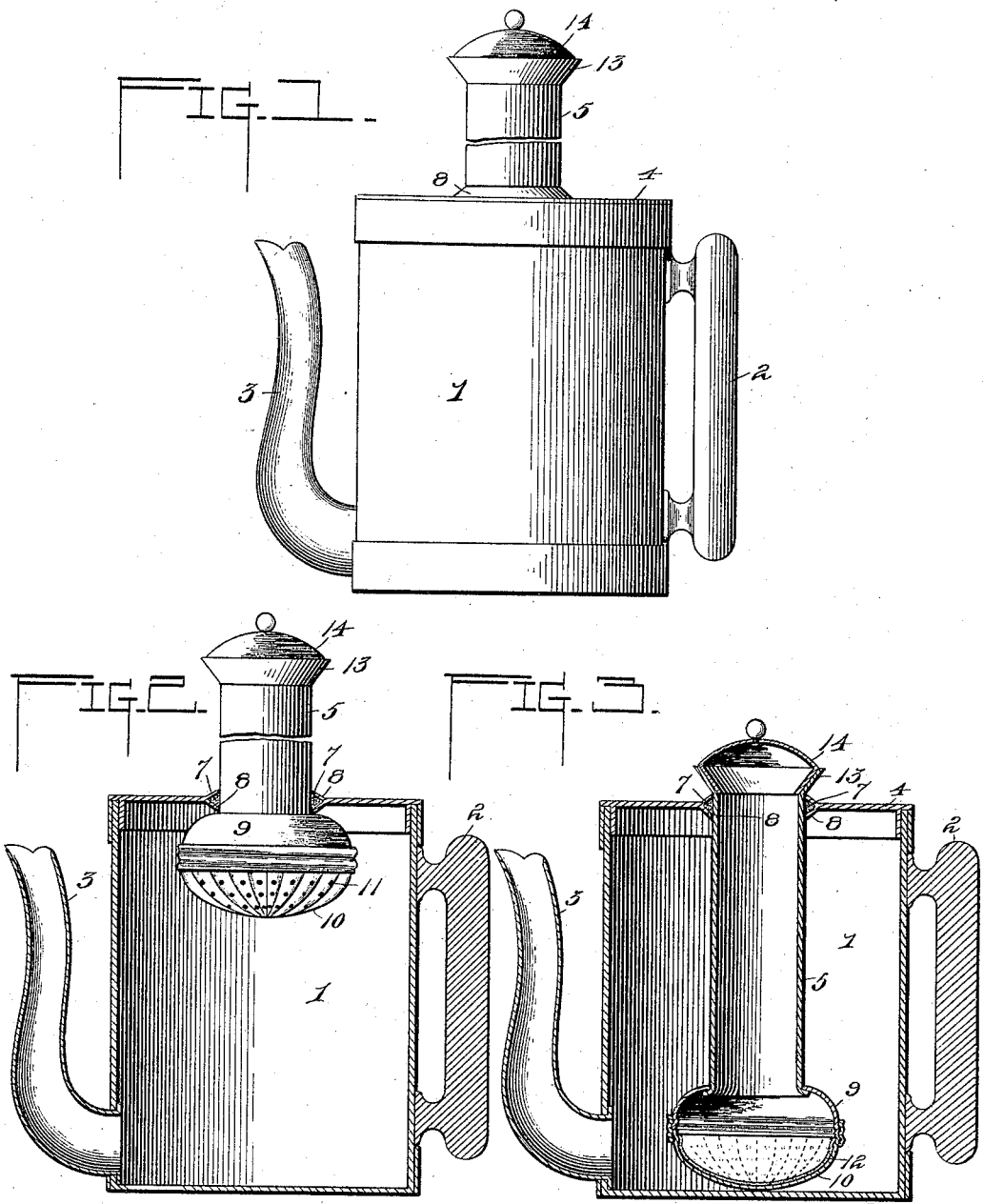

WILLIAM B. SPENCER, OF CHICAGO, ILLINOIS.

APPARATUS FOR MAKING DECOCTIONS AND INFUSIONS.

SPECIFICATION forming part of Letters Patent No. 598,447, dated February 1, 1898.

Application filed October 14, 1896. Serial No. 608,857. (No model.)

*To all whom it may concern:*

Be it known that I, WILLIAM B. SPENCER, a citizen of the United States, residing at Chicago, in the county of Cook and State of Illinois, have invented a new and useful Apparatus for Making Decoctions and Infusions, of which the following is a specification.

The invention relates to improvements in apparatus for making decoctions and infusions for medicinal and other uses.

The object of the present invention is to provide a simple, inexpensive, and efficient device adapted for making decoctions and infusions for medicinal and other uses and capable of enabling the time and manner of contact of the materials to be acted upon by a liquid to be easily regulated and of permitting such materials to be submerged the desired length of time and of being instantly and completely separated from the liquid without permitting the escape of any of the essential volatile elements, which are often present in making decoctions and infusions.

A further object of the invention is to provide a device which will enable decoctions and infusions to be accurately made of a given strength or quality and which will be capable of making a perfect decoction of coffee and an infusion of tea for ordinary table use by permitting the timely withdrawal of the original substance during the operation in order to remove all the bitter of the coffee and all the astringent as well as the other undesirable elements of either and at the same time to retain all the aroma and other desirable elements.

The invention consists in the construction and novel combination and arrangement of parts hereinafter fully described, illustrated in the accompanying drawings, and pointed out in the claims hereto appended.

In the drawings, Figure 1 is a side elevation of an apparatus constructed in accordance with this invention. Fig. 2 is a vertical sectional view of the same, the retainer and its tubular stem being shown in elevation and raised. Fig. 3 is a vertical sectional view, the retainer being shown in section and lowered.

Like numerals of reference designate corresponding parts in all the figures of the drawings.

1 designates a pot or vessel provided with a handle 2 and having a spout 3 similar to the ordinary coffee or tea pot, except that the lower end of the spout is at the bottom of the vessel and is designed to be sufficiently below the surface of the liquid contents to prevent any volatile elements escaping through it; but instead of employing the spout or discharge-pipe, as shown, an ordinary cock or faucet may be employed, as will be readily understood. The pot or vessel is provided with a removable cover 4, having a depending flange or rim and fitting within the upper edge of the pot or vessel in the ordinary manner, and it is provided with a central opening, through which passes a tubular stem 5 of a vertically-movable retainer 6, which is adapted to receive the materials to be acted upon. The lid or cover is provided at its central opening with a suitable packing 7, which is arranged within a suitable groove or flange 8 and which is adapted to prevent the escape of any of the volatile elements at that point. The retainer, which is preferably circular in the form shown and which may be constructed of any suitable material, is preferably composed of upper and lower detachable sections 9 and 10, which are provided with corresponding screw-threads at their adjacent edges, but which may be secured together in any other suitable manner. The lower section 10 is corrugated, as shown, and is provided with perforations 11, and the corrugations are adapted to support a suitable filter 12 sufficiently above the perforations to prevent them from becoming clogged in order to permit a liquid to pass freely through the container.

The filter may be constructed of any suitable material, such as cheese-cloth or the like. Instead of providing the retainer with perforations, as shown, it may be constructed of any foraminous material, such as wire-gauze or the like.

The tubular stem, which is adapted to slide in the central opening of the cover or lid 4 of the pot or vessel 1, has its upper end 13 flared and provided with a cap or cover 14.

This construction of tubular stem, besides constituting a handle, serves as a convenient funnel or filling-tube for enabling a liquid to be poured into the container; but the flaring upper end can of course be dispensed with and an ordinary stopper may be employed for closing its upper end.

It will be seen that the container is adapted to receive the materials to be acted upon by a liquid and is capable of vertical movement to permit the materials to be submerged in the liquid the desired length of time and of being instantly and completely separated from the liquid without removing the lid or cover 4 and without permitting any of the essential volatile elements escaping, and that besides enabling the time of contact of the liquid and the materials to be regulated the manner of contact may also be controlled, as the liquid may be simply poured through the container over the materials, or the latter may be entirely submerged for a given length of time. It will also be apparent that the apparatus will enable decoctions and infusions of a given strength or quality to be accurately made.

What I claim is—

1. A device of the class described, comprising a vessel provided with a cover having an opening, a foraminous container arranged within the vessel, and a tubular stem connected with the container and constituting a handle for the same and also serving as a filling-tube, said stem being slidingly mounted in the opening of the cover of the vessel, whereby coffee or other substances may be introduced into and removed from the container without removing the cover of the vessel, substantially as described.

2. A device of the class described, comprising a vessel having a cover provided with an opening, a foraminous container, a vertically-movable tubular stem secured to the container and constituting a handle and forming a filling-tube for the same, said filling-tube having its upper end flared to form a funnel and slidingly mounted in the opening of the cover, whereby coffee and other substances may be introduced into and removed from the container without removing the cover, and a stopper or cover closing the upper end of the tubular stem, substantially as described.

3. A device of the class described, comprising a vessel, a vertically-movable container mounted therein and composed of two separable sections, the lower section being corrugated and provided with perforations arranged in the grooves or gutters formed by the corrugations, and a sheet of filtering material arranged upon the corrugated portion of the container and supported out of contact with the perforations by the corrugations, substantially as and for the purpose described.

In testimony that I claim the foregoing as my own I have hereto affixed my signature in the presence of two witnesses.

WILLIAM B. SPENCER.

Witnesses:
JOHN H. SIGGERS,
W. B. HUDSON.